United States Patent
Maleki et al.

(10) Patent No.: US 12,143,933 B2
(45) Date of Patent: Nov. 12, 2024

(54) SELECTIVE CROSS-SLOT SCHEDULING FOR NR USER EQUIPMENT

(71) Applicant: Telefonaktiebolaget LM Ericsson (publ), Stockholm (SE)

(72) Inventors: Sina Maleki, Malmö (SE); Andres Reial, Lomma (SE); Ilmiawan Shubhi, Malmö (SE); Pramod Jacob Mathecken, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 672 days.

(21) Appl. No.: 17/421,534

(22) PCT Filed: Dec. 19, 2019

(86) PCT No.: PCT/EP2019/086220
§ 371 (c)(1),
(2) Date: Jul. 8, 2021

(87) PCT Pub. No.: WO2020/144036
PCT Pub. Date: Jul. 16, 2020

(65) Prior Publication Data
US 2022/0104122 A1    Mar. 31, 2022

Related U.S. Application Data

(60) Provisional application No. 62/791,502, filed on Jan. 11, 2019.

(51) Int. Cl.
*H04W 52/02* (2009.01)
*H04W 72/23* (2023.01)

(52) U.S. Cl.
CPC ... *H04W 52/0216* (2013.01); *H04W 52/0232* (2013.01); *H04W 52/028* (2013.01); *H04W 72/23* (2023.01)

(58) Field of Classification Search
None
See application file for complete search history.

(56) References Cited

U.S. PATENT DOCUMENTS

| 2014/0185537 A1 | 7/2014 | Papasakellariou |
| 2016/0242039 A1 | 8/2016 | Drugge et al. |

(Continued)

FOREIGN PATENT DOCUMENTS

| CN | 103997773 A | 8/2014 |
| CN | 107409401 A | 11/2017 |

OTHER PUBLICATIONS

"3GPP TS 38.213 V15.4.0", 3rd Generation Partnership Project; Technical Specification Group Radio Access Network; NR; Physical layer procedures for control (Release 15), Dec. 2018, pp. 1-104.

(Continued)

*Primary Examiner* — Suhail Khan
(74) *Attorney, Agent, or Firm* — Murphy, Bilak & Homiller, PLLC

(57) ABSTRACT

Embodiments include methods, performed by a user equipment (UE), for communication with a network node in a radio access network (RAN). Such methods include receiving, from the network node, an indication that a minimum scheduling offset, between a scheduling physical downlink control channel (PDCCH) and a signal or channel scheduled via the scheduling PDCCH, will change after a first duration. Such methods also include subsequently monitoring, during the first duration, for a scheduling PDCCH based on a first operating configuration; and in response to the end of the first duration, monitoring for a scheduling PDCCH based on a second operating configuration. The first duration can be related to time required, by the UE, to switch from the first to the second operating configuration. Embodiments also include UEs configured to perform such methods.

24 Claims, 11 Drawing Sheets

(56) References Cited

U.S. PATENT DOCUMENTS

2022/0232611 A1* 7/2022 Hakola ............. H04W 52/0229
2022/0312440 A1* 9/2022 Bagheri ............. H04W 72/044

OTHER PUBLICATIONS

"3GPP TS 38.214 V15.4.0", 3rd Generation Partnership Project; Technical Specification Group Radio Access Network; NR; Physical layer procedures for data (Release 15), Dec. 2018, pp. 1-102.
"Adaptation aspects of NR UE power saving", 3GPP TSG-RAN WG1 Meeting AH-1901, Tdoc R1-1901166, Taipei, Taiwan, Jan. 21-25, 2019, pp. 1-8.
"Discussion of beam management and reporting", 3GPP TSG RAN WG1 Meeting #90bis, R1-1717866, Prague, P.R. Czech, Oct. 9-13, 2017, p. 1-4.
"PDSCH and PUSCH resource allocation", 3GPP TSG RAN WG1 Meeting AH_#NR3, R1-1715824, Nagoya, Japan, Sep. 18-21, 2017, pp. 1-11.
"Triggers for NR UE power saving", 3GPP TSG-RAN WG1 Meeting AH-1901, Tdoc R1-1901167, Taipei, Taiwan, Jan. 21-25, 2019, pp. 1-13.
"UE Adaptation to the Traffic and UE Power Consumption Characteristics", 3GPP TSG-RAN WG1 Meeting #95, R1-1813447, Spokane, Washington, Nov. 12-16, 2018, pp. 1-11.
"Views on the Progress of UE Power Saving for NR", 3GPP TSG-RAN #81, RP-181763, Gold Coast, Australia, Sep. 10-13, 2018, pp. 1-2.
"Views on UE power saving", 3GPP TSG RAN WG1 Meeting #94, R1-1809462, Gothenburg, Sweden, Aug. 20-24, 2018, pp. 1-11.
"3GPP TS 36.213 V15.2.0", 3rd Generation Partnership Project; Technical Specification Group Radio Access Network; Evolved Universal Terrestrial Radio Access (E-UTRA); Physical layer procedures (Release 15), Jun. 2018, pp. 1-541.
"3GPP TS 38.211 V15.2.0", 3rd Generation Partnership Project; Technical Specification Group Radio Access Network; NR; Physical channels and modulation (Release 15), Jun. 2018, pp. 1-96.
"New SID: Study on UE Power Saving in NR", 3GPP TSG RAN Meetings #80; RP-181463; La Jolla, USA, Jun. 11-14, 2018, pp. 1-5.

* cited by examiner

SELECTIVE CROSS-SLOT SCHEDULING FOR NR USER EQUIPMENT

TECHNICAL FIELD

The present invention generally relates to wireless communication networks, and particularly relates to improvements to power consumption of wireless devices (also referred to as user equipment, or UEs) operating in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of an LTE network is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X2 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

As briefly mentioned above, the LTE RRC layer (shown in FIGS. 2B-C) controls communications between a UE and an eNB at the radio interface, as well as the mobility of a UE between cells in the E-UTRAN. In general, after the UE is powered on it will be in the RRC_IDLE state until an RRC connection is established with the network, at which time it will transition to RRC_CONNECTED state where data transfer can occur. After a connection is released, the UE returns to RRC_IDLE. In RRC_IDLE state, the UE's receiver is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context). In LTE Rel-13, a mechanism was introduced for the UE to be placed by the network in a suspended state similar to RRC_IDLE, but with certain advantages for transitioning back to RRC_CONNECTED.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe includes two consecutive slots, e.g., subframe i consists of slots $2i$ and $2i+1$. Each FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP TS 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

The LTE PHY maps the various DL and UL physical channels to the resources shown in FIGS. 3A and 3B, respectively. Both PDCCH and PUCCH can be transmitted on aggregations of one or several consecutive control channel elements (CCEs), and a CCE is mapped to the physical resource based on resource element groups (REGs), each of which is comprised of a plurality of REs.

FIG. 4 illustrates one exemplary technique for mapping CCEs and REGs to a physical resource, e.g., PRBs. As shown in FIG. 4, the REGs comprising the CCEs of PDCCH can be mapped into the first n symbols of a subframe, whereas the remaining symbols are available for other physical channels such as PDSCH or PUSCH that carry user data. In general, n=1-4 and is conveyed to UEs by the Control Format Indicator (CFI) carried by PCFICH in the first symbol of the control region. In the arrangement of FIG. 4, n=3. Each REG comprises four REs (represented by the small, dashed-line rectangles) and each a CCE includes nine (9) REGs. Although two CCEs are shown in FIG. 4, the number of CCEs may vary depending on the required PDCCH capacity, which can be determined based on number of users, amount of measurements and/or control signaling, etc. On the uplink, PUCCH can be configured similarly.

A study item on a new radio interface for 5G has been completed and 3GPP is now standardizing this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

NR shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some similar properties as the suspended condition for LTE.

In RRC_CONNECTED state, a UE monitors PDCCH for scheduled PDSCH/PUSCH and for other purposes. In LTE, depending on discontinuous reception (DRX) configuration, a UE may spend a substantial part of its energy on decoding PDCCH without detecting a PDSCH/PUSCH scheduled for it. The situation can be similar in NR if similar DRX settings with traffic modelling are utilized, since the UE will need to perform blind detection to identify whether there is a PDCCH targeted to it. Accordingly, techniques that can reduce unnecessary PDCCH monitoring, allow UE to go to sleep more often, and/or allow the UE to wake up less frequently can be beneficial.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for managing user equipment (UE) energy consumption with respect to communication with a network node in a radio access network (RAN). These exemplary methods can be performed by a user equipment (UE, e.g., wireless device, IoT device, modem, etc. or component thereof) in communication with a network node (e.g., base station, eNB, gNB, etc., or component thereof) in the RAN (e.g., E-UTRAN, NG-RAN).

These exemplary methods can include receiving, from the network node, an indication that a minimum scheduling offset will change after a first duration. The minimum scheduling offset can be between a scheduling PDCCH and a signal or channel scheduled via the scheduling PDCCH. In some embodiments, the first duration can be related to the time required, by the UE, to switch from a first operating configuration to a second operating configuration. In some embodiments, the first operating configuration can consume less energy than the second operating configuration.

In other embodiments, the first duration can be based on an initial scheduling PDCCH, for the UE, after receiving the indication; or an initial plurality of scheduling PDCCH, for the UE, after receiving the indication.

In other embodiments, the first duration can include a second plurality of PDCCH monitoring occasions, associated with the UE, during one of the following: after receiving the indication; or a third plurality of PDCCH monitoring occasions, associated with the UE, after receiving the indication, wherein the third plurality is greater than the second plurality.

In some embodiments, these exemplary methods can also include transmitting, to the network node, an indication of a processing time required for PDCCH decoding. In such embodiments, the received indication can identify a minimum scheduling offset, applicable after the end of the first duration, that is greater than or equal to the indicated processing time.

In some embodiments, these exemplary methods can also include receiving, from the network node, a configuration message identifying one or more candidate scheduling offsets. In such embodiments, the received indication can identify one of the candidate scheduling offsets as the minimum scheduling offset applicable after the end of the first duration. In some embodiments, the configuration message can be a radio resource control (RRC) message and the indication can be received via medium access control (MAC) control element (CE) or physical-layer (PHY) downlink control information (DCI).

These exemplary methods can also include subsequently monitoring, during the first duration, for a scheduling PDCCH based on the first operating configuration. These exemplary methods can also include, in response to the end of the first duration, monitoring for a scheduling PDCCH based on the second operating configuration. In some embodiments, the first and second operating configurations can differ in one or more of the following parameters: proportion of time spent in sleep mode; bandwidth parts used; and number of receive chains used.

In some embodiments, these exemplary methods can also include, during the monitoring based on the first operating configuration, detecting a first scheduling PDCCH that schedules the signal or channel for the UE; and transmitting or receiving the signal or channel at a first scheduling offset after the first scheduling PDCCH.

In some embodiments, these exemplary methods can also include, during the monitoring based on the second operating configuration, detecting a second scheduling PDCCH that schedules the signal or channel for the UE; and transmitting or receiving the signal or channel at a second scheduling offset after the second scheduling PDCCH.

In some embodiments, the first scheduling offset (e.g., applicable during the first duration) is greater than the second scheduling offset (e.g., applicable at the end of the first duration). In some of these embodiments, the second scheduling offset can include zero or more symbols within the same slot as the second scheduling PDCCH, and the first scheduling offset comprises one or more slots, or one or more symbols within the same slot (e.g., relative to a first scheduling PDCCH that occurs during the first duration. In other of these embodiments, the second scheduling offset comprises one or more slots after the second scheduling PDCCH, and the first scheduling offset comprises two or more slots (e.g., relative to a first scheduling PDCCH that occurs during the first duration).

In various embodiments, one of the following can apply:
the signal or channel is a physical downlink shared channel (PDSCH) and the first scheduling offset is K0;
the signal or channel is a physical uplink shared channel (PUSCH) and the first scheduling offset is K2; or
the signal or channel is a channel state information reference signal (CSI-RS) and the first scheduling offset is an aperiodic triggering offset.

Other exemplary embodiments of the present disclosure include methods (e.g., procedures) for managing user equipment (UE) energy consumption with respect to communication between the UE and a network node. These exemplary methods can be performed by a network node (e.g., base station, eNB, gNB, etc., or component thereof) of a radio access network (RAN, e.g., E-UTRAN, NG-RAN) in communication with the user equipment (UE, e.g., wireless device, IoT device, modem, etc. or component thereof).

These exemplary methods can include transmitting, to the UE, an indication that a minimum scheduling offset will change after a first duration. The minimum scheduling offset can be between a scheduling PDCCH and a signal or channel scheduled via the scheduling PDCCH. In some embodiments, the first duration can be related to the time required, by the UE, to switch from a first operating configuration to a second operating configuration. In some embodiments, when configured with the first operating configuration, the UE consumes less energy than when configured with the second operating configuration.

In other embodiments, the first duration can be based on an initial scheduling PDCCH, for the UE, after transmitting the indication; or an initial plurality of scheduling PDCCH, for the UE, after transmitting the indication.

In other embodiments, the first duration can include a second plurality of PDCCH monitoring occasions, associated with the UE, during one of the following: after transmitting the indication; or a third plurality of PDCCH monitoring occasions, associated with the UE, after transmitting the indication, wherein the third plurality is greater than the second plurality.

In some embodiments, these exemplary methods can also include receiving, from the UE, an indication of a processing time required for PDCCH decoding. In such embodiments, the transmitted indication can identify a minimum scheduling offset, applicable after the end of the first duration, that is greater than or equal to the indicated processing time.

In some embodiments, these exemplary methods can also include transmitting, to the UE, a configuration message identifying one or more candidate scheduling offsets. In such embodiments, the transmitted indication can identify one of the candidate scheduling offsets as the minimum scheduling offset applicable after the end of the first duration. In some embodiments, the configuration message can be a radio resource control (RRC) message and the indication can be transmitted via medium access control (MAC) control element (CE) or physical-layer (PHY) downlink control information (DCI).

These exemplary methods can also include transmitting, to the UE, a scheduling PDCCH that schedules the signal or channel for the UE. The scheduling PDCCH can be transmitted subsequent to the indication that the minimum scheduling offset will change after the first duration. These exemplary methods can also include determining a scheduling offset based on whether the scheduling PDCCH was transmitted during or after the first duration. These exemplary methods can also include transmitting or receiving the signal or channel at the determined scheduling offset after the scheduling PDCCH.

In some embodiments, determining the scheduling offset can include selecting a first scheduling offset if the scheduling PDCCH was transmitted during the first duration, and selecting a second scheduling offset if the scheduling PDCCH was transmitted after the first duration.

In some embodiments, the first scheduling offset (e.g., applicable during the first duration) is greater than the second scheduling offset (e.g., applicable at the end of the first duration). In some of these embodiments, the second scheduling offset can include zero or more symbols within the same slot as the second scheduling PDCCH, and the first scheduling offset comprises one or more slots, or one or more symbols within the same slot (e.g., relative to a first scheduling PDCCH that occurs during the first duration. In other of these embodiments, the second scheduling offset comprises one or more slots after the second scheduling PDCCH, and the first scheduling offset comprises two or more slots (e.g., relative to a first scheduling PDCCH that occurs during the first duration).

In various embodiments, one of the following can apply:
the signal or channel is a physical downlink shared channel (PDSCH) and the first scheduling offset is K0;

the signal or channel is a physical uplink shared channel (PUSCH) and the first scheduling offset is K2; or the signal or channel is a channel state information reference signal (CSI-RS) and the first scheduling offset is an aperiodic triggering offset.

Other embodiments include user equipment (UEs, e.g., wireless devices, IoT devices, or components thereof, such as a modem) and network nodes (e.g., base stations, eNBs, gNBs, CU/DUs, controllers, etc.) configured to perform operations corresponding to any of the exemplary methods described herein. Other embodiments include non-transitory, computer-readable media storing program instructions that, when executed by processing circuitry, configure such network nodes or UEs to perform operations corresponding to any of the exemplary methods described herein.

These and other aspects, features, benefits, and/or advantages of embodiments of the present disclosure will become apparent upon reading the following Detailed Description in view of the Drawings briefly described below.

DETAILED DESCRIPTION

Figure 1:
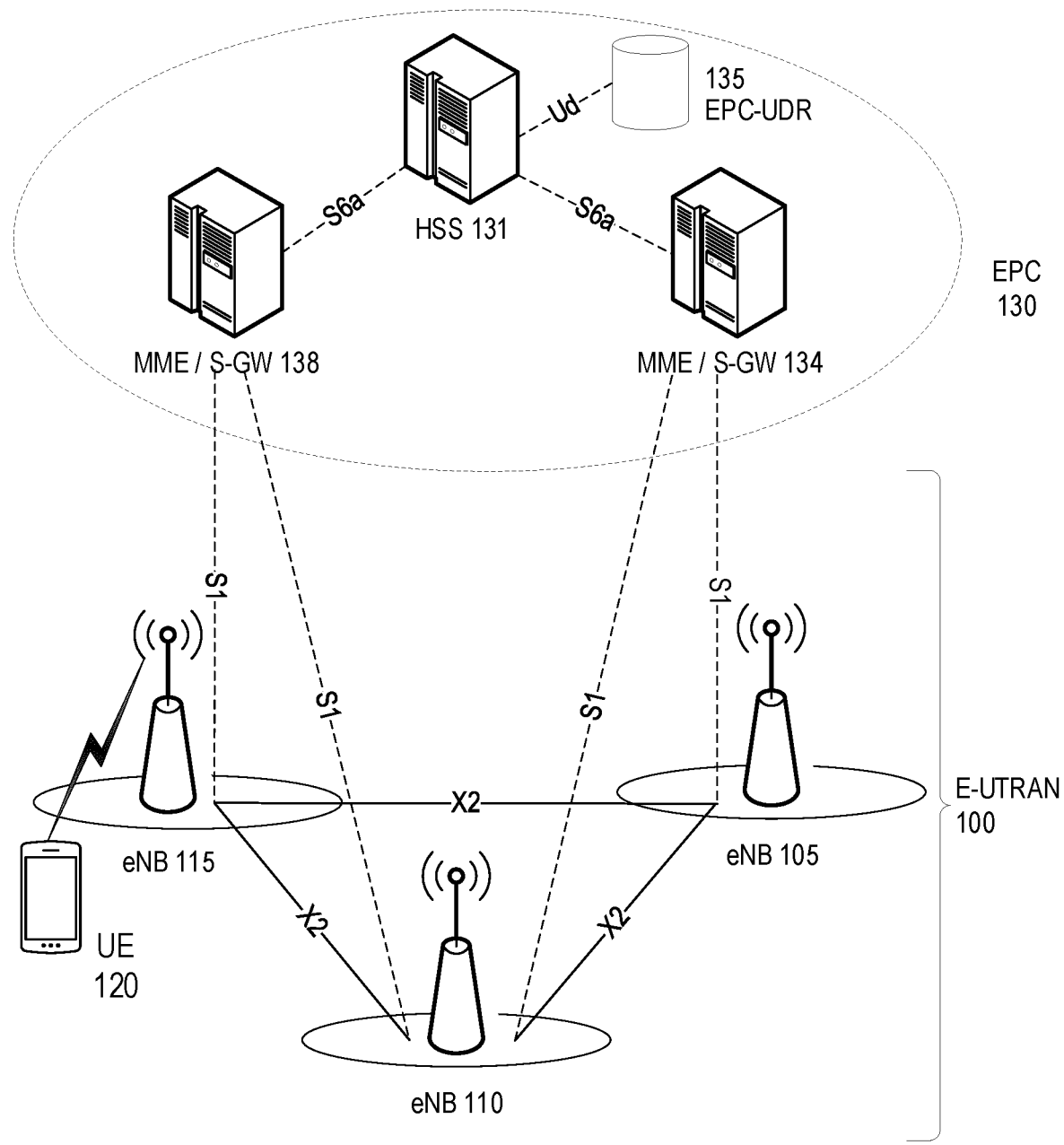
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
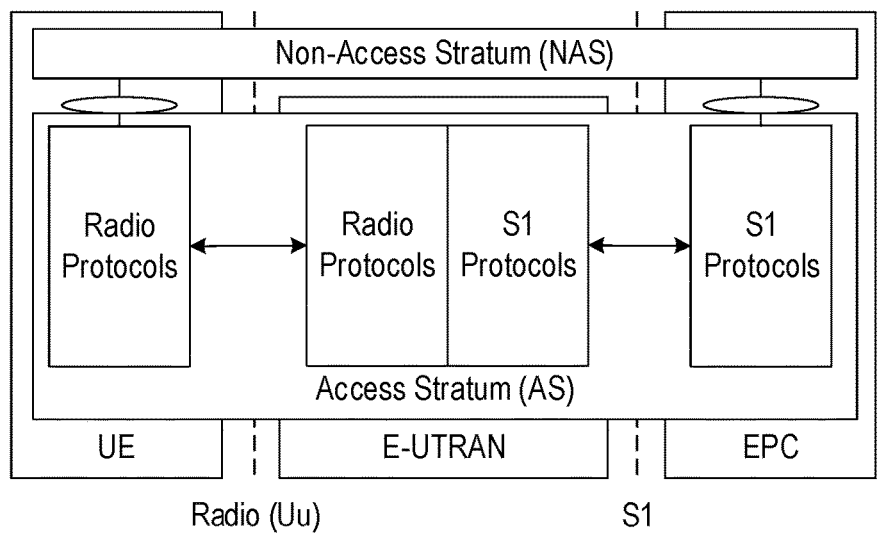
FIG. 2A is a high-level block diagram of an exemplary E-UTRAN architecture in terms of its constituent components, protocols, and interfaces.
Figure 2B:
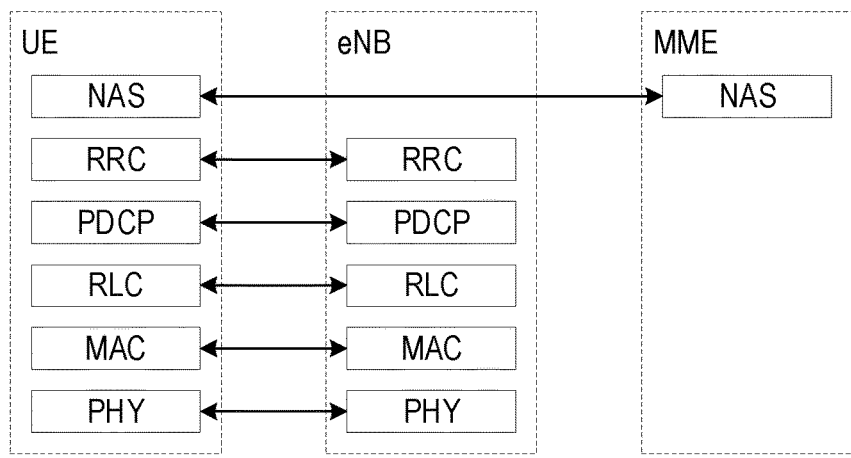
FIG. 2B is a block diagram of exemplary protocol layers of the control-plane portion of the radio (Uu) interface between a user equipment (UE) and the E-UTRAN.
Figure 2C:
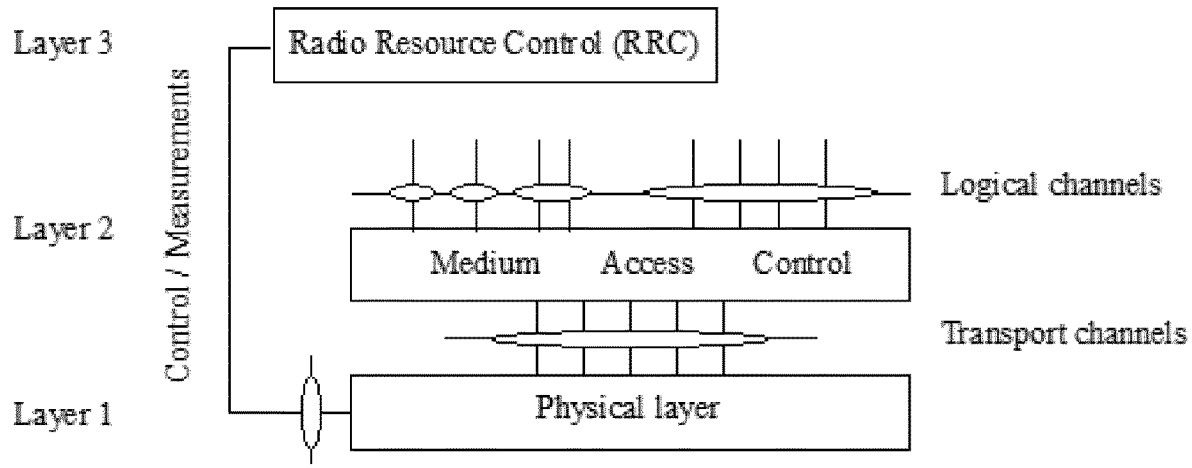
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, techniques that can reduce unnecessary PDCCH monitoring, allow UE to go to sleep more often, and/or allow the UE to wake up less frequently can be beneficial. This is discussed in more detail below.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

In Rel-15 NR, a UE can be configured with up to four carrier bandwidth parts (BWPs) in the downlink with a single downlink carrier BWP being active at a given time. A UE can be configured with up to four carrier BWPs in the uplink with a single uplink carrier BWP being active at a given time. If a UE is configured with a supplementary uplink, the UE can be configured with up to four additional carrier BWPs in the supplementary uplink, with a single supplementary uplink carrier BWP being active at a given time.

Figure 5:
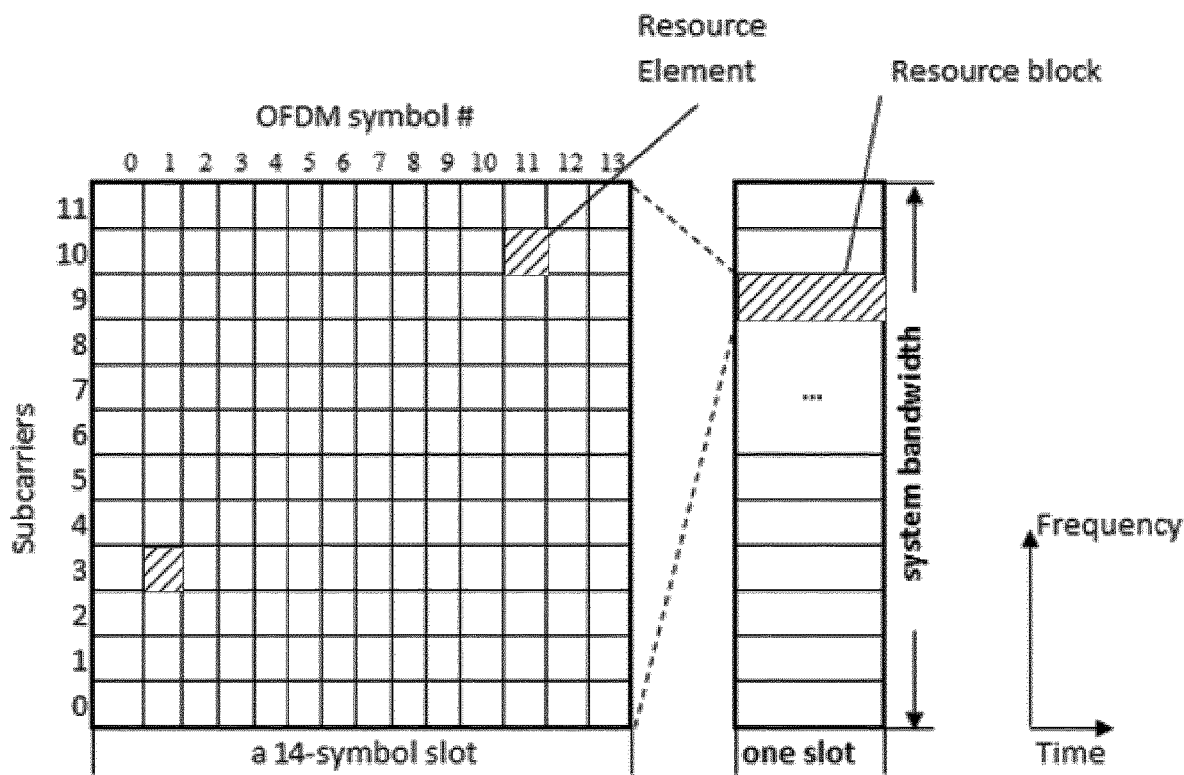
FIG. 5 shows an exemplary time-frequency resource grid for a New Radio (NR) slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2^\mu}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu \ast 180$ kHz.

Table 1 below summarizes the supported NR numerologies and associated parameters. Different DL and UL numerologies can be configured by the network.

TABLE 1

| $\mu$ | $\Delta f = 2^\mu \cdot 15$[kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 µs | 1.44 |
| 4 | 240 | Normal | 62.5 µs | 2.88 |

Figure 6A:
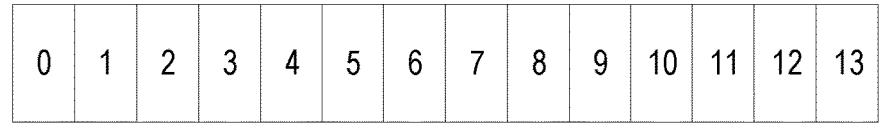
FIGS. 6A-6B show two exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
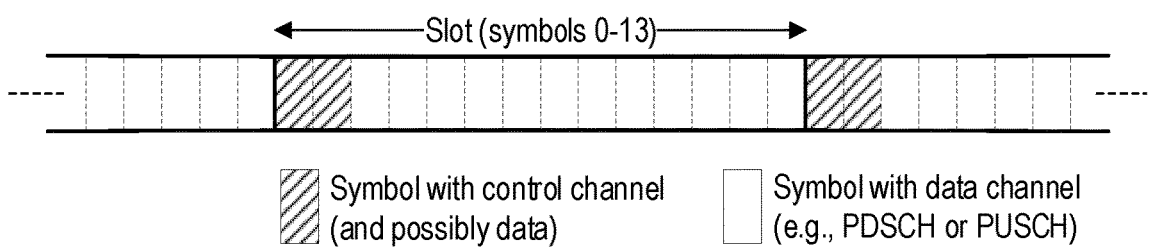

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
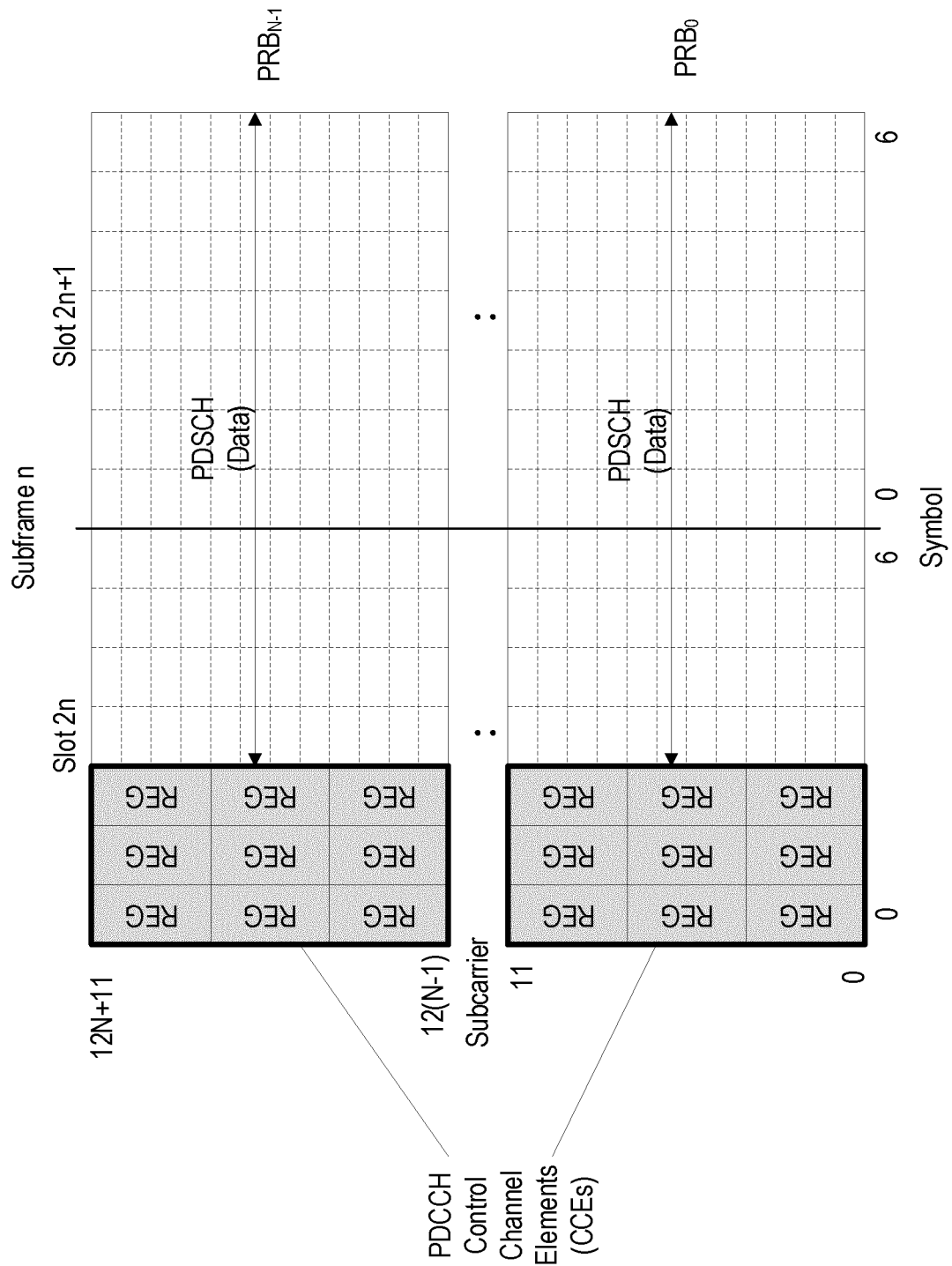
FIG. 4 shows an exemplary way in which LTE CCEs and REGs can be mapped to a physical resource.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Figure 7:
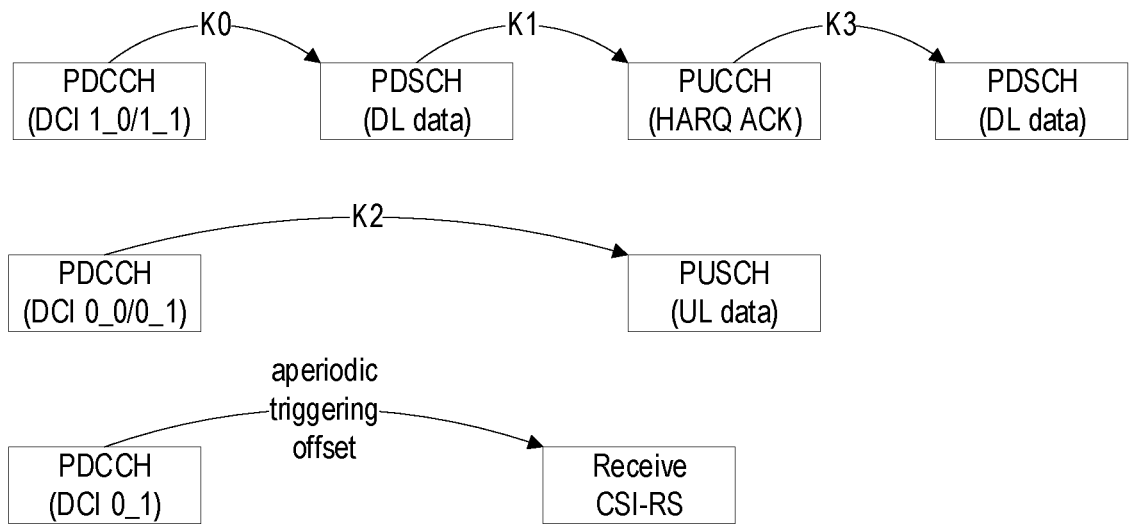
FIG. 7 illustrates various timing offsets between PDCCH, PDSCH, PUSCH, HARQ, and CSI-RS for NR

DCI can also include information about various timing offsets (e.g., in slots or subframes) between PDCCH and PDSCH, PUSCH, HARQ, and/or CSI-RS. FIG. 7 illustrates various timing offsets between PDCCH, PDSCH, PUSCH, HARQ, and CSI-RS for NR. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

As indicated above, for NR, these scheduling offsets can be larger than zero, which facilitates both same-slot (zero offset) and cross-slot (non-zero offset) scheduling. For example, cross-slot scheduling may be desirable for facilitating UE power savings by adaptively changing between upper and lower BWPs for PDCCH and PDSCH, respectively.

Figure 8:
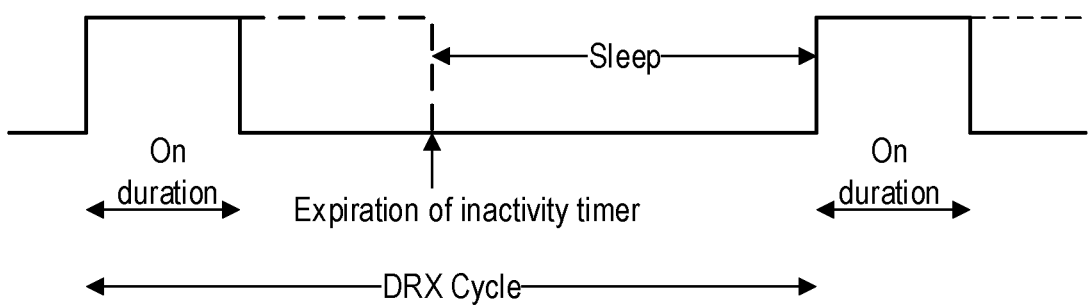
FIG. 8 shows a timing diagram that illustrates exemplary UE discontinuous reception (DRX) operation.

Discontinuous reception (DRX) is another technique that has been used to reduce UE energy consumption and prolong UE battery life. At a high level, DRX allows a UE to transition to lower power state whenever it is not required to receive any transmission from the network (e.g., gNB). FIG. 8 shows a timing diagram that illustrates exemplary DRX operation. As shown in FIG. 8, DRX operation is based on a DRX cycle, an On duration, and an inactivity timer (other parameters can be used but are omitted here for simplicity of explanation). The UE is awake and monitors PDCCH during the On duration. If no valid DCI addressed to the UE is detected during the On duration, the UE initiates the inactivity timer but continues to monitor PDCCH until either the UE detects a valid DCI addressed to it or the inactivity timer expires. The period from the beginning of the On duration until the inactivity timer expiration can be referred to as "active time." If the UE receives a valid DCI, it extends the inactivity timer and continues to monitor PDCCH. On the other hand, if the inactivity timer expires, the UE can stop PDCCH monitoring until the end of the DRX cycle and go to sleep until the beginning of the next DRX cycle.

In general, the inactivity timer counts the number of consecutive PDCCH-subframe(s)/slots after the subframe/slot in which a PDCCH indicates an initial UL, DL or sidelink (SL, i.e., UE-to-UE) user data transmission for a medium access control (MAC) entity. Typically there is one MAC entity per configured cell group, e.g., one for the master cell group (MCG) and another for the secondary cell group (SCG).

Furthermore, the DRX parameters are typically configured by RRC, which typically operates on a much slower or longer time-scale than lower layers such as MAC and PHY. As such, the DRX parameters discussed above cannot be changed adaptively via RRC, especially if the UE has a mixture of traffic types.

Typically, the UE is configured, via RRC, with a set of possible (or candidate) values for each of the scheduling offsets, i.e., K0, K1, K2, and aperiodicTriggeringOffset. However, even if the UE is aware of this set of candidate offsets, it only finds out about the particular offset (e.g., K0 for PDSCH) associated with a particular PDCCH after decoding that PDCCH (e.g., the DCI). As such, if the UE has configured a particular energy-saving operating mode, the UE may not have sufficient time to change to another operating mode to comply with a PDCCH-signaled offset.

This problem can be particularly evident for changing the UE's operating mode between PDCCH and PDSCH or CSI-RS reception. For example, a UE may be able to save energy by using a narrower BWP for PDCCH and a wider active BWP for PDSCH, or simply modify the active bandwidth setting for PDSCH based on the search space information. As another example, it may be desirable for a UE to turn off its receive chain between PDCCH and PDSCH/CSI-RS, or to monitor PDCCH with a single antenna and receive chain while receiving PDSCH with multi-antennas and receive chains.

Such adaptations can only be performed for K0>0 (PDCCH/PDSCH) and/or aperiodicTriggeringOffset>0 (PDCCH/CSI-RS), which give the UE enough time to reconfigure the receiver accordingly. Otherwise, for zero-valued offsets, the UE must maintain the receiver at full-power, PDSCH-compatible operation even when receiving PDCCH. Similar issues also exist for offsets K1 and K2. Unfortunately, the UE does not know the particular offset until it decodes PDCCH.

Nevertheless, while a fixed, non-zero offset value can help the UE reduce energy consumption, having such a fixed offset value may not be possible when load is high and/or multiple consecutive slots need to be scheduled. Then, having non-zero offset between PDCCH and PDSCH may lead to additional power consumption and latency. To summarize, ensuring a minimum (e.g., non-zero) offset or delay between PDCCH and PDSCH/PUSCH/PUCCH can facilitate energy reduction when a UE is mostly inactive, but can increase energy consumption during a sequence of multiple PDSCH transmissions.

Exemplary embodiments of the present disclosure address these and other problems, issues, and/or drawbacks by providing techniques and/or mechanisms for configuring, enabling, and/or disabling UE cross-slot scheduling with offset between PDCCH and PDSCH/PUSCH/PUCCH before the first or the Nth scheduling PDCCH, while providing non-guaranteed scheduling offset (including same-slot scheduling) during other PDCCH occasions. These embodiments can facilitate reduction in UE energy consumption by allowing a change of UE operational mode between PDCCH monitoring and subsequent PDSCH/PUSCH/PUCCH depending in the course of transmitting multiple PDSCHs. Moreover, by adapting between same- and cross-slot scheduling in this manner, embodiments reduce the average scheduling-imposed latency compared to the case where cross-slot scheduling is used in all slots. More generally, disclosed embodiments provide enhanced cross-slot scheduling that achieves UE energy consumption reduction without imposing latency and/or throughput costs associated with applying the cross-slot configuration to all PDSCH transmissions in a conventional manner.

Although explanations of the embodiments are given in terms of inter-slot offsets, principles of these embodiments can also be applied to intra-slot offsets, e.g., symbols within the same slot. For example, the current 3GPP specifications provide a possibility to start PDSCH/PUSCH transmission a number of symbols following PDCCH even within the same slot (e.g., based on Time domain resource assignment (TDRA) configuration). As in the case of cross-slot scheduling, this offset is only known after DCI decoding.

Figure 9:
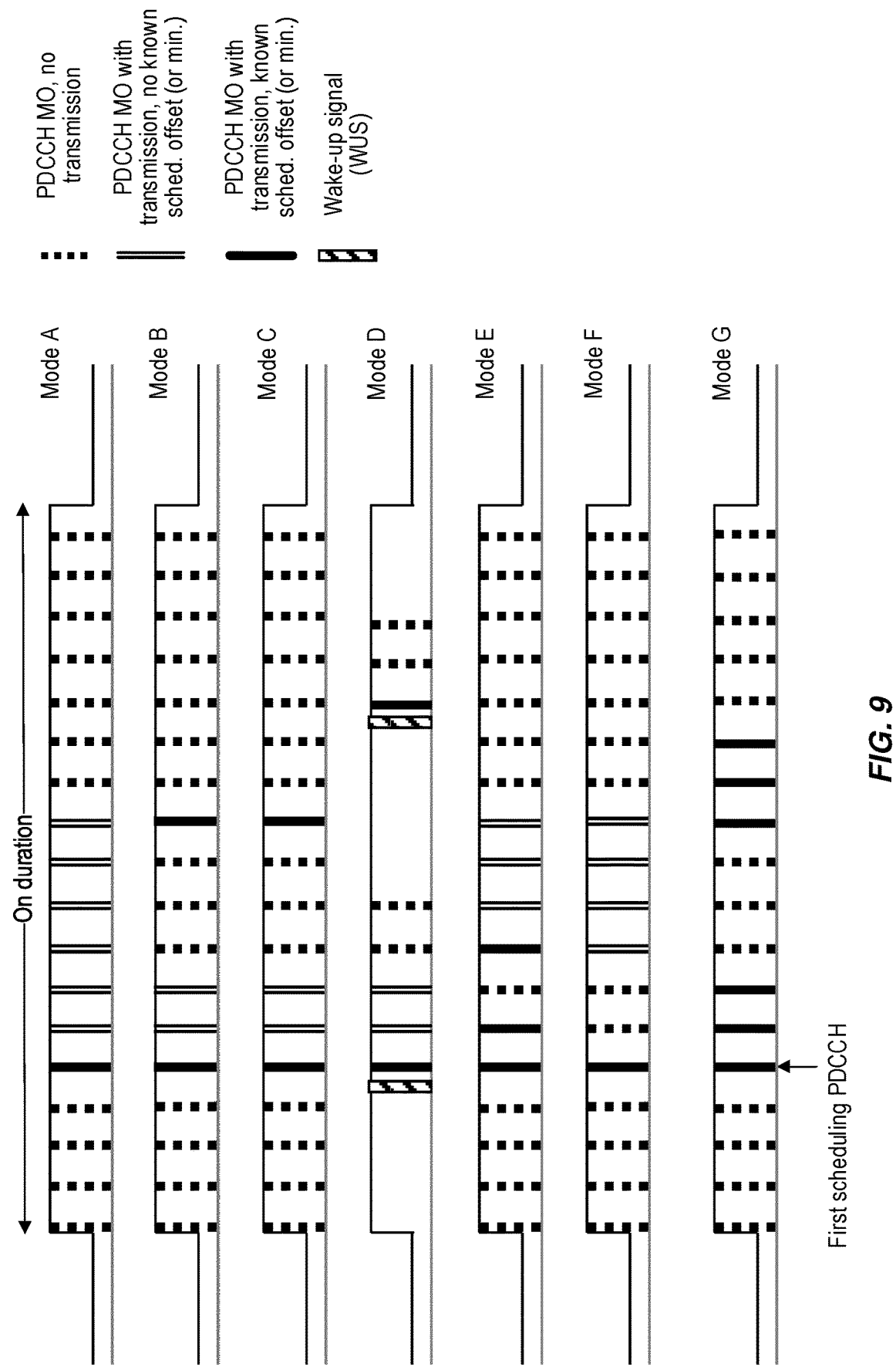
FIG. 9 shows various timing diagrams of selective cross-slot scheduling operational modes, according to various embodiments of the present disclosure.

FIG. 9 shows various timing diagrams of selective cross-slot scheduling operational modes (labelled A-G) within a UE's DRX On duration, according to various embodiments of the present disclosure. The PDCCH monitoring occasions (MOs) according to the configured UE search space(s) are indicated by dashed lines and actual PDCCH transmission(s) are indicated by solid lines. The occasions where the UE may assume cross-slot scheduling with a certain (or minimum) scheduling offset are indicated by single solid vertical lines, and occasions where no such assumption can be made are indicated by closely-spaced pairs of solid vertical lines. Wake-up signal (WUS) transmissions are indicated by cross-hatching (e.g., in mode D).

In various cross-slot scheduling modes illustrated by FIG. 9, the network can configure the UE to expect cross-slot scheduling with a known scheduling offset (or a range of scheduling offsets with a known minimum) before the first scheduling PDCCH. In various embodiments or modes shown in FIG. 9, the "first scheduling PDCCH" can be the first PDCCH transmitted after some event in one of the UE's PDCCH MOs, and that carries scheduling information for the UE (e.g., for subsequent PDSCH or PUSCH). In mode A, the first scheduling PDCCH is the first after the beginning of the UE's DRX On duration. Alternately, in mode B, the first scheduling PDCCH is the first after the end of the most recent PDSCH/PUSCH/PUCCH reception/transmission. Alternately, the first scheduling PDCCH can be the first after a specific number K of inactive slots or time durations (mode C, with K=2), or after receiving a WUS signal (mode D, with other WUS mechanisms also possible).

In other embodiments, the UE can expect cross-slot scheduling from the first to the Nth scheduling PDCCH, where the parameter N is configured by the network (e.g., via RRC). In some embodiments, the parameter N can refer to a number of actually transmitted scheduling PDCCHs (mode E, N=3) or to a number of PDCCH MOs based on the search space configuration (mode F, N=3). The UE may also be configured to assume the cross-slot configuration for N PDCCH occasions that occur a during certain time interval (e.g., up to K PDCCH occasions) after the most recent received PDCCH (mode G, K=2, N=3).

In some embodiments, in addition to being configured with respect to cross-slot PDSCH scheduling, the UE can also be configured (e.g., via RRC) to assume that it will not be scheduled for aperiodic CSI reporting in between, such that the UE can change its receiver operational mode without maintaining readiness for CSI measurements.

Further exemplary embodiments are discussed below, and are generally divided into two groups: 1) UE configuration via RRC signaling; or 2) UE configuration via MAC CE or DCI. Although these examples are provided in terms of first scheduling PDCCH and cross slot scheduling, the principles associated with these examples can also be applied to embodiments involving an Nth scheduling PDCCH, and to embodiments involving same-slot scheduling with a number of symbols between PDCCH and PDSCH/PUSCH/PUCCH.

In a first group of embodiments, the UE can be configured via RRC signaling to expect and/or assume cross-slot scheduling is to be used for the first PDCCH, as well as a minimum scheduling offset (e.g., minimum K0 or K2 slots) that can be used for the cross-slot scheduling.

In some embodiments of this group, the UE can send to the network a capability report that includes a UE PDCCH decoding processing time capability (e.g., in slots). Upon receiving this report, the network can take into account the UE's processing time capability, such that the network does not consider any lower scheduling offset values for cross-slot scheduling. Knowing that the network will not schedule prior to this minimum offset, the UE can opt for different operational modes during this time, such as micro sleep.

In general, the network can strike an acceptable, proper, and/or optimal balance between reducing UE energy consumption and keeping latency low by selecting the minimum processing (or mode switching time) as the offset value. Nevertheless, the network can consider other parameters and/or values when selecting the offset. In some embodiments, in addition to or instead of the processing time, the UE can also send to the network additional performance capabilities, such as time required to turn ON and/or OFF the UE's receive chains, time required to transfer between active and sleep states, time required to switch between BWP configurations, etc. The network can consider any of these received parameters and/or values when selecting the scheduling offset. Even so, the network is not required to base the selection of scheduling offset on these capabilities and/or preferences received from the UE.

In some embodiments, if the network decides not to base the selection on these values, the network can respond to the UE with an indication of this outcome. Given this response, the UE can adjust its expectations of cross-slot scheduling offset accordingly. Alternately, the network can inform the UE of the actual (or a minimum) scheduling offset, without explicitly informing that UE whether or not the capabilities and/or preferences that it provided were taken into account in the selection of that actual (or minimum) scheduling offset. Likewise, the network can subsequently reconfigure the actual (or minimum) scheduling offset value through RRC signaling (e.g., a reconfiguration procedure).

In other embodiments, the network can configure the UE to expect the cross-slot scheduling (e.g., of PDSCH) for the first scheduling PDCCH at all times, or in periodic or aperiodic DRX cycles. The pattern can be preconfigured by the network during RRC configuration. Similarly, the network can configure the UE to expect cross-slot scheduling for the first scheduling PDCCH until instructed otherwise, e.g., via an RRC reconfiguration.

In a second group of embodiments, the network can use MAC control element (CE) and/or DCI signaling to enable, disable, and/or reconfigure a UE configuration of cross-slot scheduling for the first scheduling PDCCH. For example, the network can use MAC CE and/or DCI to enable, disable, and/or reconfigure a UE configuration that the network previously made by RRC.

In some embodiments of this group, MAC CE and/or DCI signaling can indicate that the UE should apply a preconfigured (e.g., via RRC) cross-slot scheduling for the first PDCCH after the last PDSCH/PUSCH/PUCCH or a specific number of inactive time duration/slots. In other embodiments, MAC CE and/or DCI signaling can also be used to override and/or reconfigure the previously configured parameters related to cross-slot scheduling for the first scheduling PDCCH. In addition, MAC CE and/or DCI signaling can be used to disable the UE's cross-slot scheduling assumption for the first scheduling PDCCH. For example, the network can disable the UE's cross-slot scheduling assumption if the network has, or expects to have, downlink data to send to the UE. Upon receiving this disabling configuration, the UE can prepare its receive chains and other processing capabilities accordingly (e.g., to receive same-slot PDSCH).

In some embodiments of this group, the network can configure the UE (e.g., via RRC) with multiple explicit cross-slot scheduling configurations before the first scheduling PDCCH, and then use MAC CE and/or DCI signaling to be used to enable and/or disable a particular one of these configurations, and/or to switch between the various configurations.

In some embodiments of this group, a MAC CE command for enabling, disabling, or reselecting a cross-slot scheduling configuration can be multiplexed in the last PDSCH message sent to the UE before the first PDCCH to which it applies. Alternately, the MAC CE command can be sent in its own PDSCH message prior to the first PDCCH. It can also be multiplexed in the first PDSCH or in between, particularly when disabling explicit cross-slot scheduling is needed. The same applied to the DCI signaling, the information for enabling, disabling, and/or reselection can be included in the last scheduling DCI, the first, and/or an in-between, or even as an independent DCI. For example, within DCI, any reserved bits or any bits referring to a reserved or invalid value of a particular field (e.g., an invalid MCS row index) can be used to enable, disable, or reselect a cross-slot scheduling configuration.

Various exemplary embodiments have been discussed above in relation to explicit cross-slot scheduling for the first scheduling PDCCH for a UE currently operating in DRX mode, such as illustrated by the examples shown in FIG. 9. Nevertheless, the principles of these embodiments can also apply to cases where wake-up (WUS)/go-to-sleep (GTS) signaling is used to indicate wake-up or go-to-sleep during or before ON duration/inactivity timer. For example, in some embodiments, WUS signal itself can be used to indicate the beginning (e.g., enable) or end (e.g., disable) of explicit cross-slot scheduling that was previously configured (e.g., via RRC). Alternately, an explicit command carried by the WUS can be used for this purpose. GTS signaling can be used in a similar manner.

In addition to configuring the UE to expect cross-slot scheduling for the first PDCCH, the network can also configure the UE to change scheduling patterns after the first PDCCH. For example, the UE can be configured to change to a same-slot pattern or a different cross-slot pattern after the first PDCCH. As a particular example, the network can facilitate significant energy consumption reductions in the UE by scheduling all the PDSCH/PUSCH/PUCCH associated with the UE in same slot after the first PDCCH.

In other embodiments, the network does not explicitly configure the UE to expect cross-slot scheduling for the first (or up to Nth) scheduling PDCCH in the manner discussed above, but nonetheless uses cross-slot scheduling for the UE. In such embodiments, the UE can collect historical data related to the network's cross-slot scheduling configurations. Based on this collected data, the UE can determine that the network is likely to use cross-slot scheduling for PDCCH in an upcoming scenario that is consistent with, or corresponds to, the historical data. Based on this determination, the UE can change its operating mode to reduce energy consumption. If the network does not use cross-slot scheduling in the upcoming scenario, as the UE predicted and/or determined, the UE can send a NACK in the assigned PUCCH/PUSCH resources, which does not add much latency while facilitating reduction in UE energy consumption.

The embodiments described above can be further illustrated with reference to FIGS. 10-11, which depict exemplary methods (e.g., procedures) performed by UEs and network nodes, respectively. Put differently, various features of the operations described below correspond to various embodiments described above.

Figure 10:
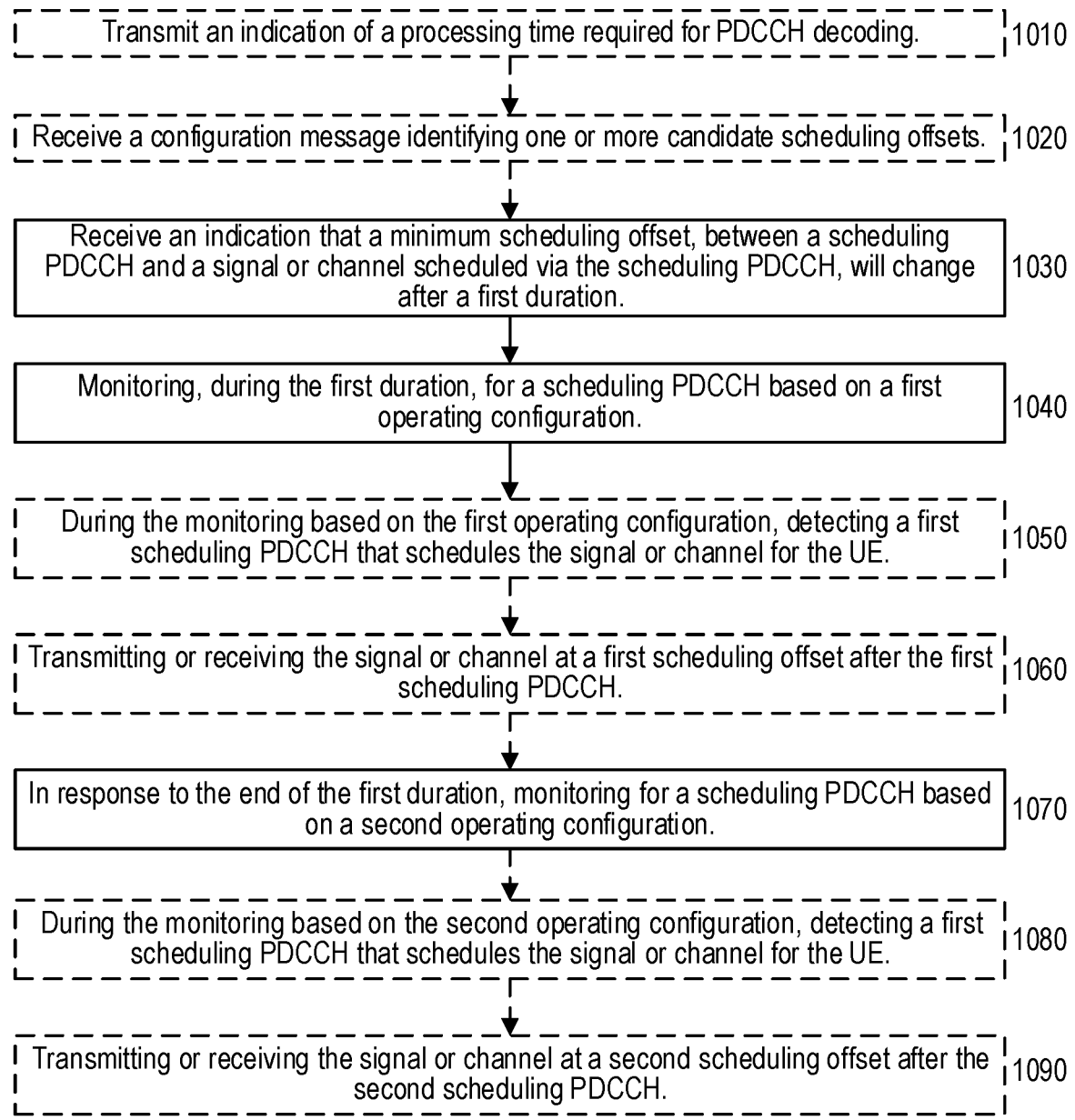
FIG. 10 shows a flow diagram of an exemplary method (e.g., procedure) performed by a user equipment (UE, e.g., wireless device, MTC device, NB-IoT device, modem, etc. or component thereof), according to various embodiments of the present disclosure.

In particular, FIG. 10 shows a flow diagram of an exemplary method (e.g., procedure) for managing user equipment (UE) energy consumption with respect to communication with a network node in a radio access network (RAN), according to various exemplary embodiments of the present disclosure. The exemplary method can be performed by a user equipment (UE, e.g., wireless device, IoT device, modem, etc. or component thereof) in communication with a network node (e.g., base stations, eNBs, gNBs, etc., or components thereof) in the RAN (e.g., E-UTRAN, NG-RAN). For example, the exemplary method shown in FIG. 10 can be implemented by a UE configured as described herein with reference to other figures. Furthermore, the exemplary method shown in FIG. 10 can be used cooperatively with other exemplary methods described herein (e.g., FIG. 11) to provide various benefits and/or advantages, including those described herein. Although FIG. 10 shows specific blocks in a particular order, the operations of the blocks can be performed in a different order than shown and can be combined and/or divided into blocks having different functionality than shown. Optional blocks or operations are indicated by dashed lines.

The exemplary method can include the operations of block 1030, where the UE can receive, from the network node, an indication that a minimum scheduling offset will change after a first duration. The minimum scheduling offset can be between a scheduling PDCCH and a signal or channel scheduled via the scheduling PDCCH. In some embodiments, the first duration can be related to the time required, by the UE, to switch from a first operating configuration to a second operating configuration. In some embodiments, the first operating configuration can consume less energy than the second operating configuration. In some embodiments, the first and second operating configurations can differ in one or more of the following parameters: proportion of time spent in sleep mode; bandwidth parts (BWPs) used; and number of receive chains used. As such, the first duration can be related to, or based on, to the time required to turn on/off the UE's receive chains, time required to transfer between active and sleep states, time required to switch between BWP configurations, etc.

In other embodiments, the first duration can be based on an initial scheduling PDCCH, for the UE, after receiving the indication; or an initial plurality of scheduling PDCCH, for the UE, after receiving the indication.

In other embodiments, the first duration can include a second plurality of PDCCH monitoring occasions, associated with the UE, during one of the following: after receiving the indication; or a third plurality of PDCCH monitoring occasions, associated with the UE, after receiving the indication, wherein the third plurality is greater than the second plurality.

In some embodiments, the exemplary method can also include the operations of block 1010, where the UE can transmit, to the network node, an indication of a processing time required for PDCCH decoding. In such embodiments, the received indication (e.g., in block 1030) can identify a minimum scheduling offset, applicable after the end of the first duration, that is greater than or equal to the indicated processing time.

In some embodiments, the exemplary method can also include the operations of block 1020, where the UE can receive, from the network node, a configuration message identifying one or more candidate scheduling offsets. In such embodiments, the received indication (e.g., in block 1030) can identify one of the candidate scheduling offsets as the minimum scheduling offset applicable after the end of the first duration. In some embodiments, the configuration message is a radio resource control (RRC) message and the indication is received via medium access control (MAC) control element (CE) or physical-layer (PHY) downlink control information (DCI).

The exemplary method can also include the operations of block 1040, where the UE can subsequently monitor, during the first duration, for a scheduling PDCCH based on the first operating configuration. The exemplary method can also include the operations of block 1070, where the UE can, in response to the end of the first duration, monitor for a scheduling PDCCH based on the second operating configuration. In some embodiments, the first and second operating configurations can differ in one or more of the following parameters: proportion of time spent in sleep mode; bandwidth parts used; and number of receive chains used.

In some embodiments, the exemplary method can also include the operations of blocks 1050-1060. In block 1050, the UE can, during the monitoring based on the first operating configuration, detect a first scheduling PDCCH that schedules the signal or channel for the UE. In block 1060, the UE can transmit or receive the signal or channel at a first scheduling offset after the first scheduling PDCCH.

In some embodiments, the exemplary method can also include the operations of blocks 1080-1090. In block 1080, the UE can, during the monitoring based on the second operating configuration, detect a second scheduling PDCCH that schedules the signal or channel for the UE. In block 1060, the UE can transmit or receive the signal or channel at a second scheduling offset after the second scheduling PDCCH.

In some embodiments, the first scheduling offset (e.g., applicable during the first duration) is greater than the second scheduling offset (e.g., applicable at the end of the first duration). In some of these embodiments, the second scheduling offset can include zero or more symbols within the same slot as the second scheduling PDCCH, and the first scheduling offset can include one or more slots, or one or more symbols within the same slot (e.g., relative to a first scheduling PDCCH that occurs during the first duration). For example, in such embodiments, the second scheduling offset can facilitate same-slot scheduling (e.g., in the same or subsequent symbol as the PDCCH) and the first scheduling offset can facilitate cross-slot scheduling or cross-symbol scheduling within a mini-slot (e.g., during the first duration).

In other of these embodiments, the second scheduling offset can include one or more slots after the second scheduling PDCCH, and the first scheduling offset can include two or more slots (e.g., relative to a first scheduling PDCCH that occurs during the first duration). In other words, although both the first and second scheduling offsets facilitate cross-slot scheduling, the second scheduling offset is a lesser number of slots than the first scheduling offset.

In various embodiments, one of the following can apply:
the signal or channel is a physical downlink shared channel (PDSCH) and the first scheduling offset is K0;
the signal or channel is a physical uplink shared channel (PUSCH) and the first scheduling offset is K2; or
the signal or channel is a channel state information reference signal (CSI-RS) and the first scheduling offset is an aperiodic triggering offset.

Figure 11:
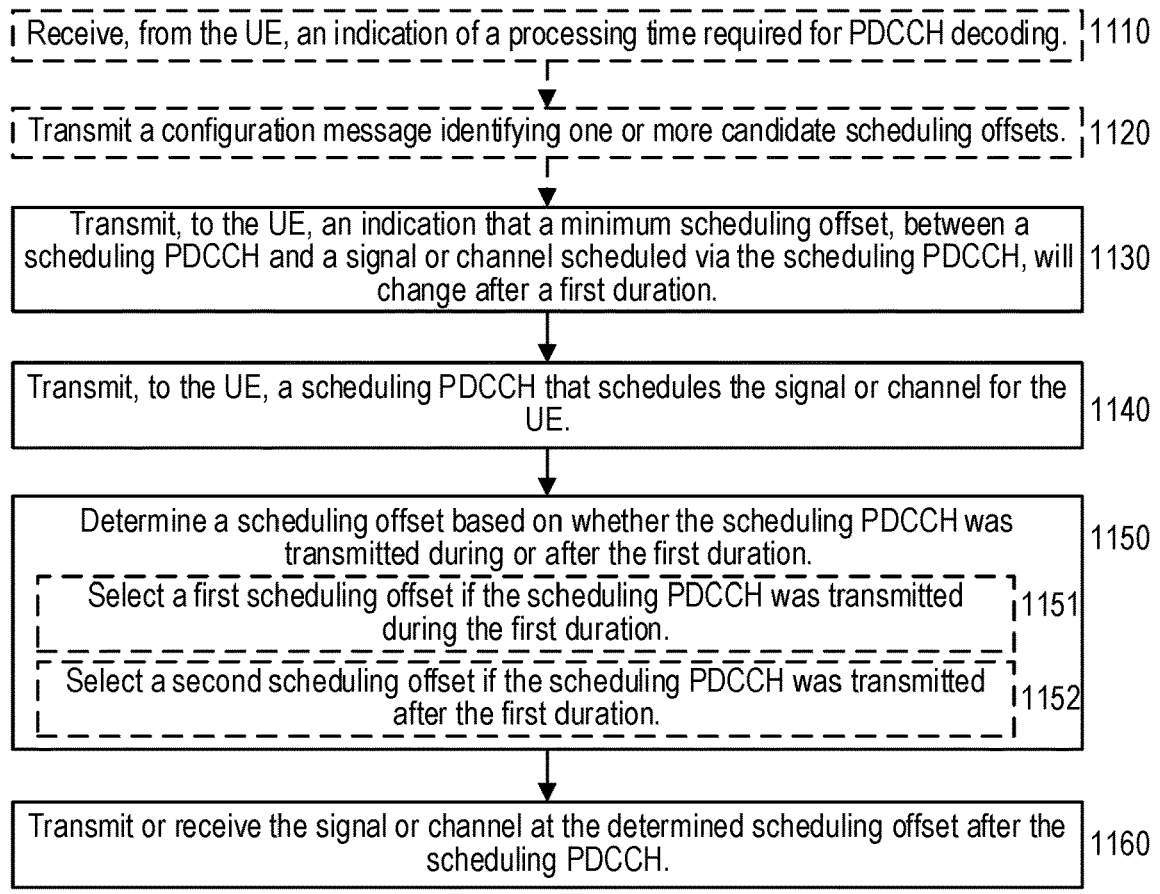
FIG. 11 shows a flow diagram of an exemplary method (e.g., procedure) performed by a network node (e.g., base station, gNB, eNB, ng-eNB, etc. or component thereof) in a radio access network (RAN, e.g., E-UTRAN, NG-RAN), according to various embodiments of the present disclosure.

In addition, FIG. 11 shows a flow diagram of an exemplary method (e.g., procedure) for managing user equipment (UE) energy consumption with respect to communication between the UE and a network node, according to various exemplary embodiments of the present disclosure. The exemplary method can be performed by a network node (e.g., base station, eNB, gNB, etc., or component thereof) of a radio access network (RAN, e.g., E-UTRAN, NG-RAN), in communication with the user equipment (UE, e.g., wireless device, IoT device, modem, etc. or component thereof). For example, the exemplary method shown in FIG. 11 can be implemented in a network node configured as described herein with reference to other figures. Furthermore, the exemplary method shown in FIG. 11 can be used cooperatively with other exemplary methods described herein (e.g., FIG. 10) to provide various exemplary benefits and/or advantages, including those described herein. Although FIG. 11 shows specific blocks in a particular order, the operations of the exemplary method can be performed in a different order than shown and can be combined and/or divided into blocks having different functionality than shown. Optional blocks or operations are shown by dashed lines.

The exemplary method can include the operations of block 1130, where the network node can transmit, to the UE, an indication that a minimum scheduling offset will change after a first duration. The minimum scheduling offset can be between a scheduling PDCCH and a signal or channel scheduled via the scheduling PDCCH. In some embodiments, the first duration can be related to the time required, by the UE, to switch from a first operating configuration to a second operating configuration. In some embodiments, when configured with the first operating configuration, the UE consumes less energy than when configured with the second operating configuration. In some embodiments, the first and second operating configurations can differ in one or more of the following parameters: proportion of time spent in sleep mode; bandwidth parts (BWPs) used; and number of receive chains used. As such, the first duration can be related to, or based on, to the time required to turn on/off the UE's receive chains, time required to transfer between active and sleep states, time required to switch between BWP configurations, etc.

In other embodiments, the first duration can be based on an initial scheduling PDCCH, for the UE, after transmitting the indication; or an initial plurality of scheduling PDCCH, for the UE, after transmitting the indication.

In other embodiments, the first duration can include a second plurality of PDCCH monitoring occasions, associated with the UE, during one of the following: after transmitting the indication; or a third plurality of PDCCH monitoring occasions, associated with the UE, after transmitting the indication, wherein the third plurality is greater than the second plurality.

In some embodiments, the exemplary method can also include the operations of block 1110, where the network node can receive, from the UE, an indication of a processing time required for PDCCH decoding. In such embodiments, the transmitted indication (e.g., in block 1130) can identify a minimum scheduling offset, applicable after the end of the first duration, that is greater than or equal to the indicated processing time.

In some embodiments, the exemplary method can also include the operations of block 1120, where the network node can transmit, to the UE, a configuration message identifying one or more candidate scheduling offsets. In such embodiments, the transmitted indication (e.g., in block 1130) can identify one of the candidate scheduling offsets as the minimum scheduling offset applicable after the end of the first duration. In some embodiments, the configuration message is a radio resource control (RRC) message and the indication is transmitted via medium access control (MAC) control element (CE) or physical-layer (PHY) downlink control information (DCI).

The exemplary method can also include the operations of block 1140, where the network node can transmit, to the UE, a scheduling PDCCH that schedules the signal or channel for the UE. The scheduling PDCCH can be transmitted subsequent to the indication transmitted in block 1140. The exemplary method can also include the operations of block 1150, where the network node can determine a scheduling offset based on whether the scheduling PDCCH was transmitted during or after the first duration. The exemplary method can also include the operations of block 1160, where the network node can transmit or receive the signal or channel at the determined scheduling offset after the scheduling PDCCH.

In some embodiments, the determining operations of block 1150 can include the operations of sub-blocks 1151-1152. In sub-block 1151, the network node can select a first scheduling offset if the scheduling PDCCH was transmitted during the first duration. In sub-block 1152, the network node can select a second scheduling offset if the scheduling PDCCH was transmitted after the first duration.

In some embodiments, the first scheduling offset (e.g., applicable during the first duration) is greater than the second scheduling offset (e.g., applicable at the end of the first duration). In some of these embodiments, the second scheduling offset can include zero or more symbols within the same slot as the second scheduling PDCCH, and the first scheduling offset can include one or more slots, or one or more symbols within the same slot (e.g., relative to a first scheduling PDCCH that occurs during the first duration). For example, in such embodiments, the second scheduling offset can facilitate same-slot scheduling (e.g., in the same or subsequent symbol as the PDCCH) and the first scheduling offset can facilitate cross-slot scheduling or cross-symbol scheduling within a mini-slot (e.g., during the first duration).

In other of these embodiments, the second scheduling offset can include one or more slots after the second scheduling PDCCH, and the first scheduling offset can include two or more slots (e.g., relative to a first scheduling PDCCH that occurs during the first duration). In other words, although both the first and second scheduling offsets facilitate cross-slot scheduling, the second scheduling offset is a lesser number of slots than the first scheduling offset.

In various embodiments, one of the following can apply:
the signal or channel is a physical downlink shared channel (PDSCH) and the first scheduling offset is K0;
the signal or channel is a physical uplink shared channel (PUSCH) and the first scheduling offset is K2; or
the signal or channel is a channel state information reference signal (CSI-RS) and the first scheduling offset is an aperiodic triggering offset.

Although various embodiments are described herein above in terms of methods, the person of ordinary skill will recognize that such methods can be embodied by various combinations of hardware and software in various systems, communication devices, computing devices, control devices, apparatus, devices, computer-readable media, computer program products, etc.

Figure 12:
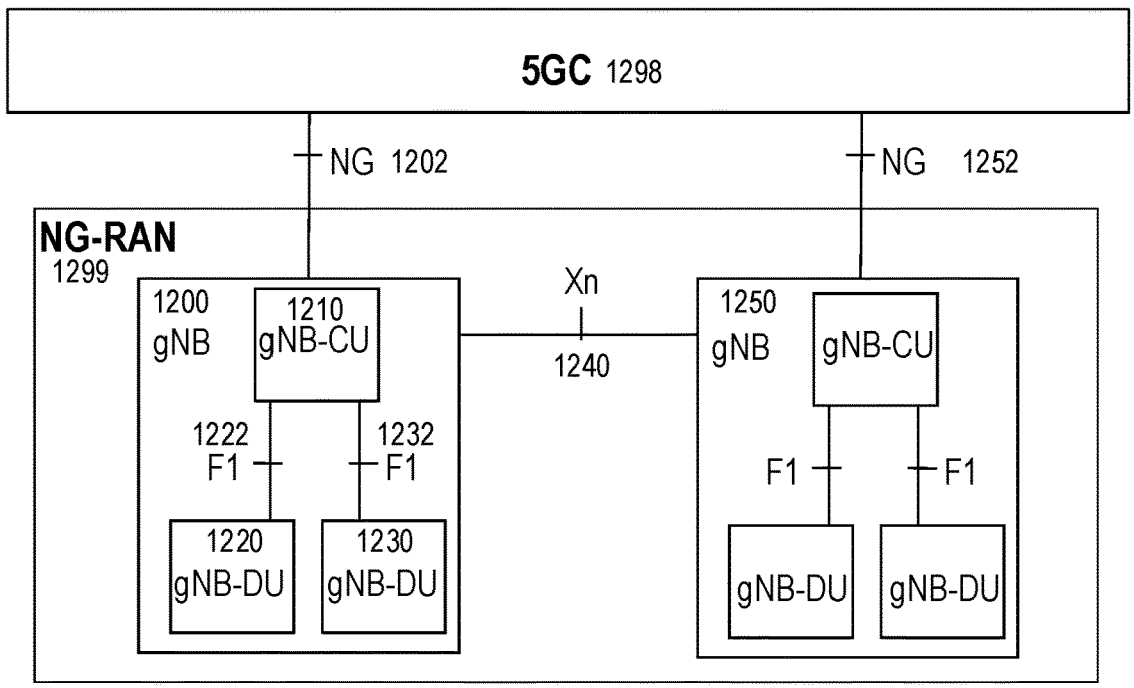
FIG. 12 illustrates a high-level view of an exemplary 5G network architecture.

As an example, FIG. 12 illustrates a high-level view of the 5G network architecture, consisting of a Next Generation RAN (NG-RAN) 1299 and a 5G Core (5GC) 1298. NG-RAN 1299 can include a set of gNodeB's (gNBs) connected to the 5GC via one or more NG interfaces, such as gNBs 1200, 1250 connected via interfaces 1202, 1252, respectively. In addition, the gNBs can be connected to each other via one or more Xn interfaces, such as Xn interface 1240 between gNBs 1200 and 1250. With respect to the NR interface to UEs, each of the gNBs can support frequency division duplexing (FDD), time division duplexing (TDD), or a combination thereof.

The NG RAN logical nodes shown in FIG. 12 (and described in TS 38.401 and TR 38.801) include a central (or centralized) unit (CU or gNB-CU) and one or more distributed (or decentralized) units (DU or gNB-DU). For example, gNB 1200 in FIG. 12 includes gNB-CU 1212 and gNB-DUs 1220 and 1230. CUs (e.g., gNB-CU 1212) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
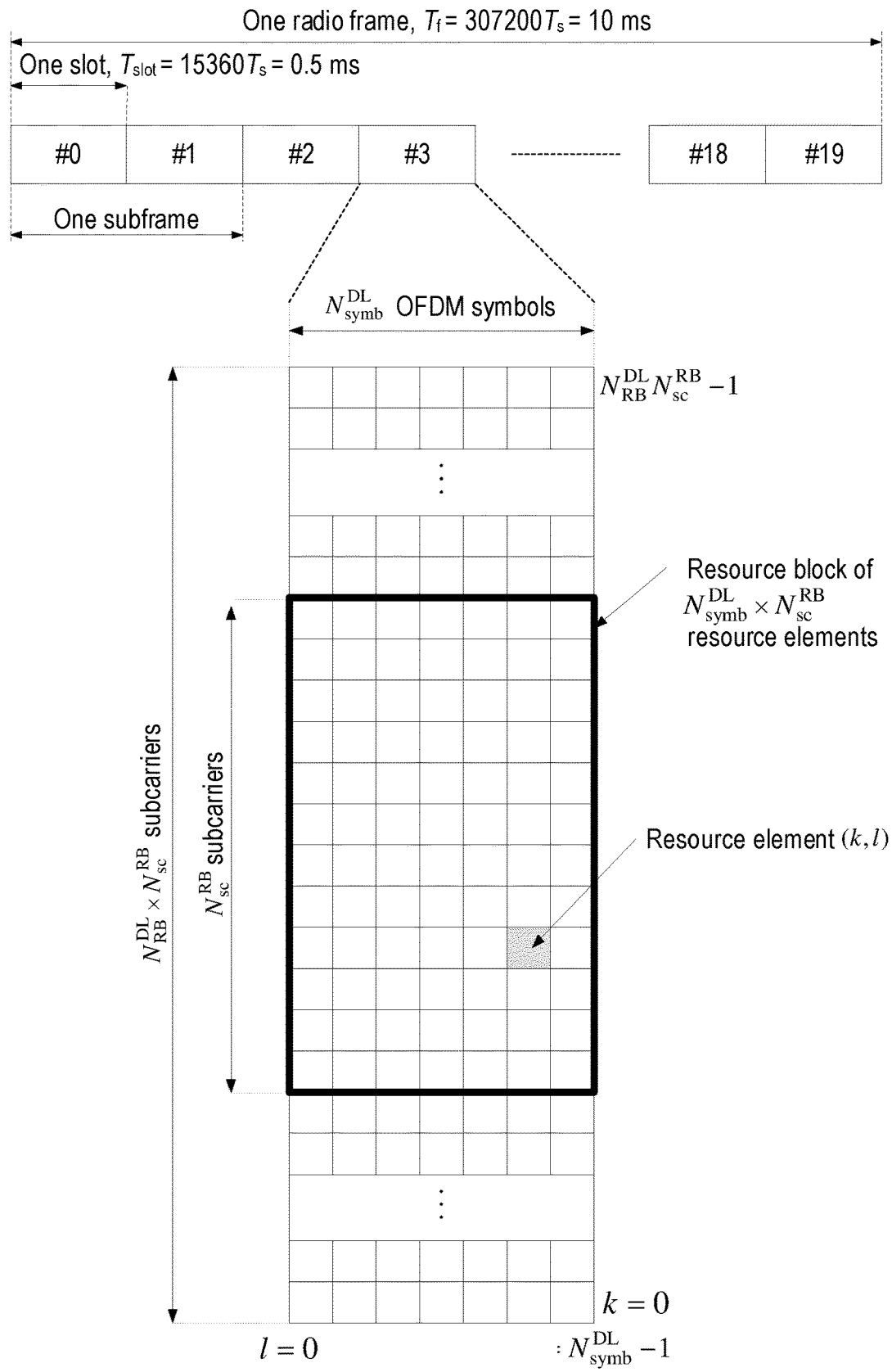
FIGS. 3A and 3B are block diagrams, respectively, of exemplary downlink and uplink LTE radio frame structures used for frequency division duplexing (FDD) operation.
Figure 3B:
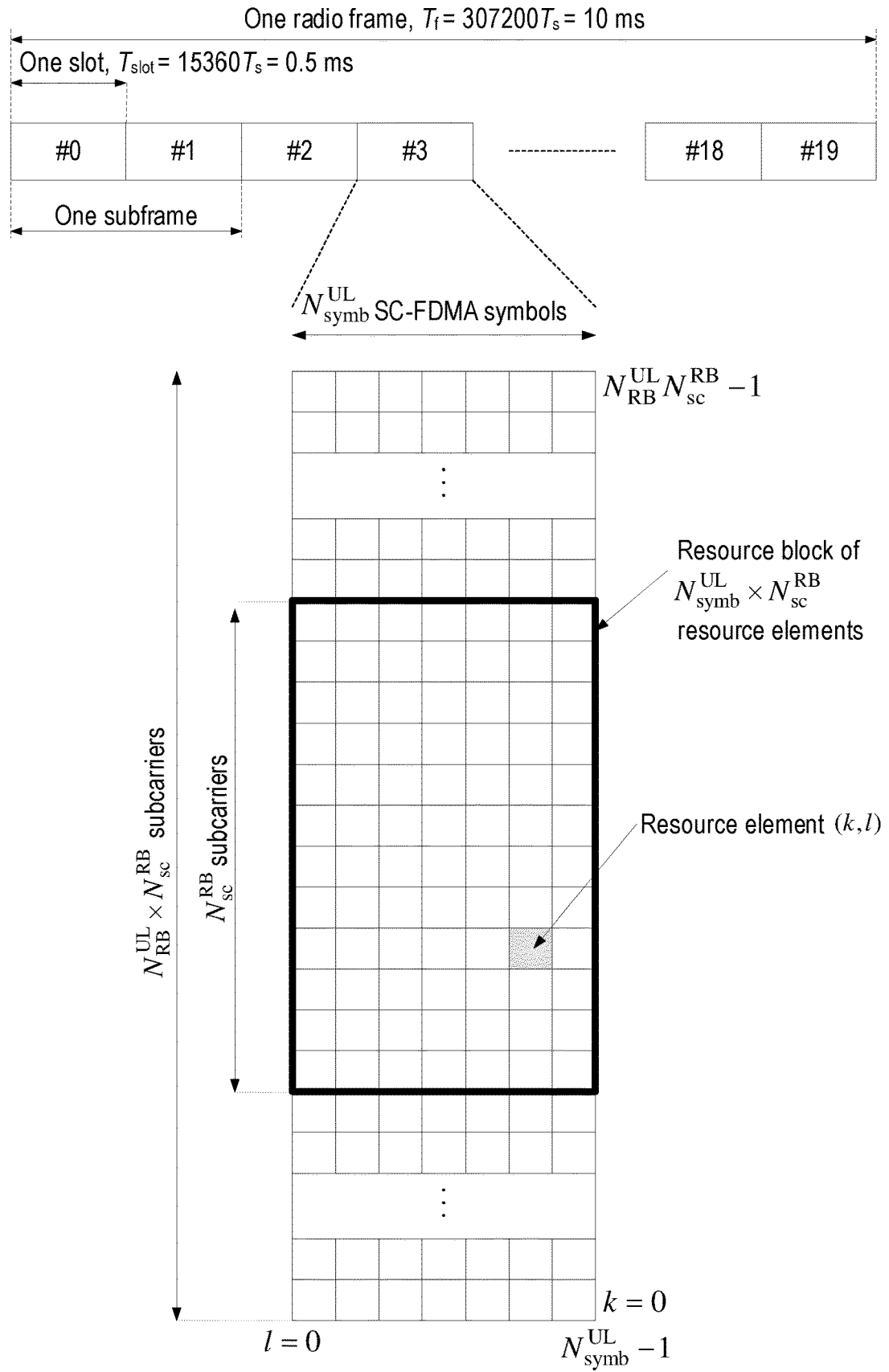

A gNB-CU connects to gNB-DUs over respective F1 logical interfaces, such as interfaces 1222 and 1232 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 13:
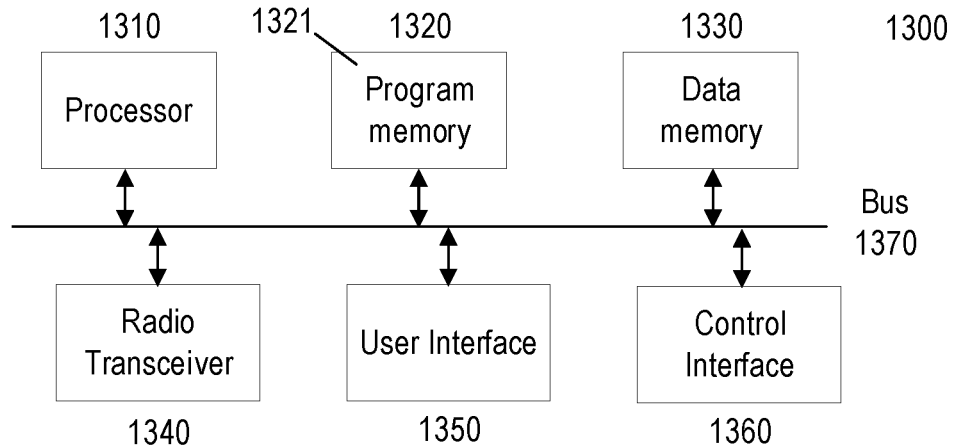
FIG. 13 is a block diagram of an exemplary wireless device or UE, according to various embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods and/or procedures described above.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1361 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or host interface 1360. Program memory 1320 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods and/or procedures described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible UEs.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods and/or procedures described herein or otherwise known to persons of ordinary skill in the art.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, an RS-4135 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including various exemplary methods and/or computer-readable media according to various exemplary embodiments of the present disclosure.

Figure 14:
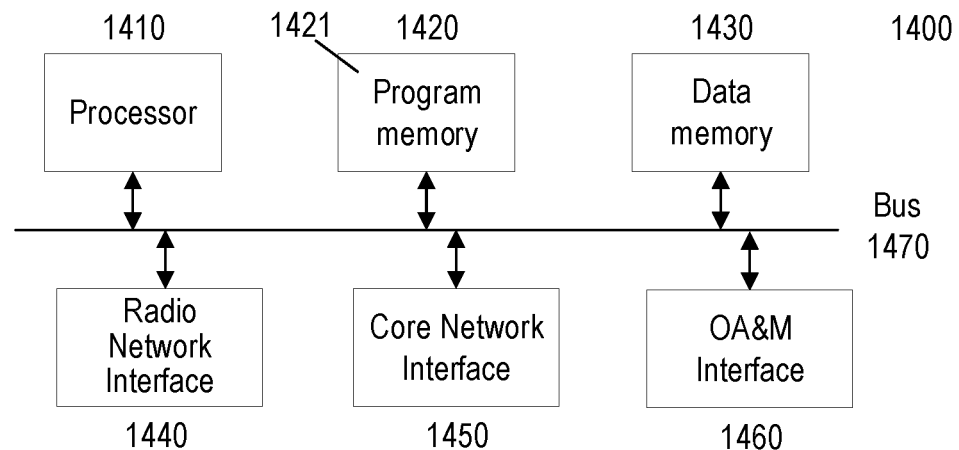
FIG. 14 is a block diagram of an exemplary network node, according to various embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods and/or procedures described above. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMES, SGSNs, GGSNs, and other physical devices that comprise functionality found in GERAN, UTRAN, EPC, SGC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
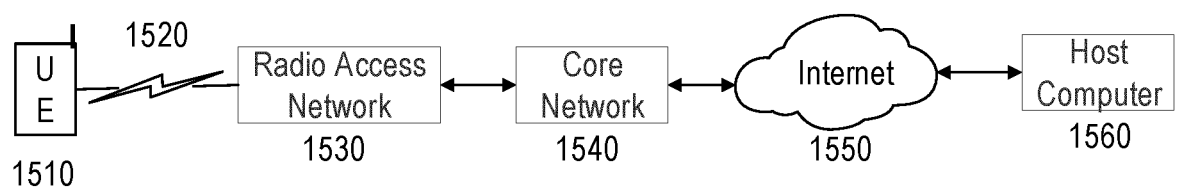
FIG. 15 is a block diagram of an exemplary network configured to provide over-the-top (OTT) data services between a host computer and a UE, according to various embodiments of the present disclosure.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1650 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface, such as shown in FIG. 1. As another example, gNBs comprising a NR RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for enhanced cross-slot scheduling (e.g., PDCCH to PDSCH or PUSCH) that achieves UE energy consumption reduction without imposing latency and/or throughput costs associated with applying a cross-slot configuration to all PDSCH/PUSCH transmissions in a conventional manner. When used in NR and/or LTE UEs (e.g., UE 1510) and eNBs and/or gNBs (e.g., comprising RAN 1530), exemplary embodiments described herein can reduce UE energy consumption for PDCCH monitoring, thereby facilitating such UEs to use their stored energy capacity (e.g., in a battery) for other operations, such as receiving and/or transmitting data via OTT services (e.g., over PDSCH or PUSCH). Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for managing user equipment (UE) energy consumption with respect to receiving physical downlink control channel (PDCCH) transmissions from network node in a radio access network (RAN), the method comprising:
   receiving indication of a first scheduling offset between a scheduling PDCCH and a corresponding signal or channels scheduled via the scheduling PDCCH, wherein the first scheduling offset is applicable for a first duration;
   during the first duration, receiving a first scheduling PDCCH based on a first operating configuration;
   switching to a second operational configuration during the first scheduling offset after receiving the first scheduling PDCCH; and
   based on the second operating configuration, transmitting or receiving the corresponding first signal or channel scheduled via the first scheduling PDCCH.

2. The method of embodiment 1, wherein the first scheduling offset comprises a plurality of consecutive slots or a plurality of consecutive symbols within a slot.

3. The method of any of embodiments 1-2, further comprising, after the end of the first duration, receiving a further scheduling PDCCH based on the second operating configuration.

4. The method of embodiment 3, further comprising, after a second scheduling offset following the further scheduling PDCCH, transmitting or receiving a corresponding further signal or channel that was scheduled via the further scheduling PDCCH, wherein the second scheduling offset is less than the first scheduling offset.

5. The method of embodiment 4, wherein the second scheduling offset comprises a single slot or a single symbol within a slot.

6. The method of any of embodiments 1-5, wherein the first duration extends until receipt of one of the following:
   the first scheduling PDCCH after receiving the indication; and
   a first plurality of scheduling PDCCH after receiving the indication.

7. The method of any of embodiments 1-5, wherein the first duration comprises a second plurality of PDCCH reception occasions during one of the following periods:
   after receiving the indication; and
   a third plurality of PDCCH reception occasions after receiving the indication, wherein the third plurality is greater than the second plurality.

8. The method of any of embodiments 1-7, wherein the first scheduling PDCCH is the initial scheduling PDCCH during one of the following periods:
   a discontinuous reception (DRX) On duration;
   after transmission or reception of one of the signals or channels;
   after a plurality of inactive periods; and
   after reception of a wake-up signal (WUS).

9. The method of any of embodiments 1-8, wherein the first operating configuration consumes less energy than the second operating configuration.

10. The method of any of embodiments 1-9, further comprising transmitting, to the network node, an indication of a processing time required for PDCCH decoding, wherein the received first scheduling offset is greater than the indicated processing time.

11. The method of any of embodiments 1-10, further comprising receiving a configuration message identifying one or more possible scheduling offset configurations including the first scheduling offset, wherein the received indication enables the first scheduling offset.

12. The method of embodiment 11, wherein:
the configuration message is a radio resource control (RRC) message; and
the indication is received via one of the following: medium access control (MAC) control element (CE); and downlink control information (DCI).

13. The method of any of embodiments 11-12, further comprising receiving a further indication that disables the first scheduling offset.

14. A method for managing user equipment (UE) energy consumption with respect to receiving physical downlink control channel (PDCCH) transmissions from a network node in a radio access network (RAN), the method comprising:
transmitting, to the UE, an indication of a first scheduling offset between a scheduling PDCCH and a corresponding signal or channels scheduled via the scheduling PDCCH, wherein the first scheduling offset is applicable for a first duration;
during the first duration, transmitting a first scheduling PDCCH;
after the first scheduling offset following the first scheduling PDCCH, transmitting or receiving a corresponding first signal or channel scheduled via the first scheduling PDCCH.

15. The method of embodiment 14, wherein the first scheduling offset comprises a plurality of consecutive slots or a plurality of consecutive symbols within a slot.

16. The method of any of embodiments 14-15, further comprising:
after the end of the first duration, transmitting a further scheduling PDCCH; and
after a second scheduling offset following the further scheduling PDCCH, transmitting or receiving a corresponding further signal or channel that was scheduled via the further scheduling PDCCH, wherein the second scheduling offset is less than the first scheduling offset.

17. The method of embodiment 16, wherein the second scheduling offset is a single slot or a single symbol within a slot.

18. The method of any of embodiments 14-17, wherein the first duration extends until transmission of one of the following:
the first scheduling PDCCH after transmitting the indication; and
a first plurality of scheduling PDCCH after transmitting the indication.

19. The method of any of embodiments 14-18, wherein the first duration comprises a second plurality of PDCCH reception occasions, associated with the UE, during one of the following periods:
after transmitting the indication; and
a third plurality of PDCCH reception occasions after transmitting the indication, wherein the third plurality is greater than the second plurality.

20. The method of any of embodiments 14-19, wherein the first scheduling PDCCH is the initial scheduling PDCCH during one of the following periods:
a discontinuous reception (DRX) On duration for the UE;
after transmission or reception of one of the signals or channels;
after a plurality of inactive periods of the UE; and
after transmission of a wake-up signal (WUS) to the UE.

21. The method of any of embodiments 14-20, further comprising:
receiving, from the UE, an indication of a processing time required for PDCCH decoding; and
selecting the first scheduling offset to be greater than the indicated processing time.

22. The method of any of embodiments 14-21, further comprising transmitting, to the UE, a configuration message identifying one or more possible scheduling offset configurations including the first scheduling offset, wherein the transmitted indication enables the first scheduling offset.

23. The method of embodiment 22, wherein:
the configuration message is a radio resource control (RRC) message; and
the indication is transmitted via one of the following: medium access control (MAC) control element (CE); and downlink control information (DCI).

24. The method of any of embodiments 22-23, further comprising transmitting a further indication that disables the first scheduling offset.

25. A user equipment (UE) configured to manage energy consumption with respect to receiving physical downlink control channel (PDCCH) transmissions from a network node in a radio access network (RAN), the UE comprising:
communication circuitry configured to communicate with a network node; and
processing circuitry operatively associated with the communication circuitry and configured to perform operations corresponding to the methods of any of exemplary embodiments 1-13.

26. A network node, in a radio access network (RAN), configured to manage user equipment (UE) energy consumption with respect to physical downlink control channel (PDCCH) transmissions from the network node, wherein the network node comprises:
communication circuitry configured to communicate with the one or more UEs; and
processing circuitry operatively associated with the communication circuitry and configured to perform operations corresponding to the methods of any of exemplary embodiments 14-24.

27. A user equipment (UE) configured to manage energy consumption with respect to receiving physical downlink control channel (PDCCH) transmissions from a network node in a radio access network (RAN), the UE being arranged to perform operations corresponding to the methods of any of exemplary embodiments 1-13.

28. A network node, in a radio access network (RAN), configured to manage user equipment (UE) energy consumption with respect to physical downlink control channel (PDCCH) transmissions, the network node being arranged to perform operations corresponding to the methods of any of exemplary embodiments 14-24.

29. A non-transitory, computer-readable medium storing computer-executable instructions that, when executed by at least one processor of a user equipment (UE), configure the UE to perform operations corresponding to the methods of any of exemplary embodiments 1-13.

30. A non-transitory, computer-readable medium storing computer-executable instructions that, when executed by at least one processor of a network node, configure the network node to perform operations corresponding to the methods of any of exemplary embodiments 14-24.

The invention claimed is:

1. A method performed by a user equipment (UE) in communication with a network node of a radio access network (RAN), the method comprising:
   receiving, from the network node, an indication that a minimum scheduling offset, between a scheduling physical downlink control channel (PDCCH) and a signal or channel scheduled via the scheduling PDCCH, will change after a first duration;
   subsequently monitoring, during the first duration, for a scheduling PDCCH based on a first operating configuration; and
   in response to the end of the first duration, monitoring for a scheduling PDCCH based on a second operating configuration.

2. The method of claim 1 wherein the first and second operating configurations differ in one or more of the following parameters:
   proportion of time spent in sleep mode;
   bandwidth parts used; and
   number of receive chains used.

3. The method of claim 1, wherein the first duration is related to the time required, by the UE, to switch from the first operating configuration to the second operating configuration.

4. The method of claim 1, further comprising:
   during the monitoring based on the second operating configuration, detecting a second scheduling PDCCH that schedules the signal or channel for the UE; and
   transmitting or receiving the signal or channel at a second scheduling offset after the second scheduling PDCCH,
   wherein the second scheduling offset is less than a first scheduling offset applicable during the first duration.

5. The method of claim 4, wherein:
   the second scheduling offset comprises zero or more symbols within the same slot as the second scheduling PDCCH; and
   the first scheduling offset comprises one or more slots, or one or more symbols within the same slot.

6. The method of claim 4, wherein:
   the second scheduling offset comprises one or more slots; and
   the first scheduling offset comprises two or more slots.

7. The method of claim 1, further comprising:
   during the monitoring based on the first operating configuration, detecting a first scheduling PDCCH that schedules the signal or channel for the UE; and
   transmitting or receiving the signal or channel at a first scheduling offset after the first scheduling PDCCH.

8. The method of claim 1, wherein the first duration is based on one of the following:
   an initial scheduling PDCCH, for the UE, after receiving the indication; and
   an initial plurality of scheduling PDCCH, for the UE, after receiving the indication.

9. The method of claim 1, wherein the first duration comprises a second plurality of PDCCH monitoring occasions, associated with the UE, during one of the following:
   after receiving the indication; or
   a third plurality of PDCCH monitoring occasions, associated with the UE, after receiving the indication, wherein the third plurality is greater than the second plurality.

10. The method of claim 1, wherein:
    the method further comprises transmitting, to the network node, an indication of a processing time required for PDCCH decoding; and
    the received indication identifies a minimum scheduling offset, applicable after the end of the first duration, that is greater than or equal to the indicated processing time.

11. The method of claim 1, wherein:
    the method further comprises receiving, from the network node, a configuration message identifying one or more candidate scheduling offsets; and
    the received indication identifies one of the candidate scheduling offsets as the minimum scheduling offset applicable after the end of the first duration.

12. A method performed by a network node of a radio access network (RAN), the method comprising:
    transmitting, to a user equipment (UE), an indication that a minimum scheduling offset, between a scheduling physical downlink control channel (PDCCH) and a signal or channel scheduled via the scheduling PDCCH, will change after a first duration;
    subsequently transmitting, to the UE, a scheduling PDCCH that schedules the signal or channel for the UE;
    determining a scheduling offset based on whether the scheduling PDCCH was transmitted during or after the first duration; and
    transmitting or receiving the signal or channel at the determined scheduling offset after the scheduling PDCCH.

13. The method of claim 12, wherein the first duration is related to the time required, by the UE, to switch from a first operating configuration to a second operating configuration.

14. The method of claim 12, wherein determining the scheduling offset comprises:
    selecting a first scheduling offset if the scheduling PDCCH was transmitted during the first duration; and
    selecting a second scheduling offset if the scheduling PDCCH was transmitted after the first duration,
    wherein the second scheduling offset is less than the first scheduling offset.

15. The method of claim 14, wherein:
    the second scheduling offset comprises zero or more symbols within the same slot as the second scheduling PDCCH; and
    the first scheduling offset comprises one or more slots, or one or more symbols within the same slot.

16. The method of claim 14, wherein:
    the second scheduling offset comprises one or more slots; and
    the first scheduling offset comprises two or more slots.

17. The method of claim 12, wherein the first duration is based on one of the following:
    an initial scheduling PDCCH, for the UE, after transmitting the indication; and
    an initial plurality of scheduling PDCCH, for the UE, after transmitting the indication.

18. The method of claim 12, wherein the first duration is based on a second plurality of PDCCH monitoring occasions, associated with the UE, during one of the following:
    after transmitting the indication; or
    a third plurality of PDCCH monitoring occasions, associated with the UE, after transmitting the indication, wherein the third plurality is greater than the second plurality.

19. The method of claim 12, wherein:
    the method further comprises receiving, from the UE, an indication of a processing time required for PDCCH decoding; and
    the minimum scheduling offset is greater than the indicated processing time.

20. The method of claim 12, wherein:
the method further comprises transmitting, to the UE, a configuration message identifying one or more candidate scheduling offsets;
the transmitted indication identifies one of the candidate scheduling offsets as the minimum scheduling offset applicable after the end of the first duration.

21. A user equipment (UE) configured for communication with a network node of a radio access network (RAN), the UE comprising:
transceiver circuitry configured to communicate with the network node; and
processing circuitry operatively coupled to the transceiver circuitry, whereby the processing circuitry and the transceiver circuitry are configured to:
receive, from the network node, an indication that a minimum scheduling offset, between a scheduling physical downlink control channel (PDCCH) and a signal or channel scheduled via the scheduling PDCCH, will change after a first duration;
subsequently monitor, during the first duration, for a scheduling PDCCH based on a first operating configuration; and
in response to the end of the first duration, monitor for a scheduling PDCCH based on a second operating configuration.

22. A non-transitory, computer-readable medium storing computer-executable instructions that, when executed by processing circuitry of a user equipment, UE that is configured for communication with a network node in a radio access network (RAN), configure the UE to perform operations corresponding to the method of claim 1.

23. A network node configured for operation in a radio access network (RAN), the network node comprising:
radio network interface circuitry configured to communicate with a user equipment (UE); and
processing circuitry operatively coupled to the radio network interface circuitry, whereby the processing circuitry and the radio network interface circuitry are configured to perform operations corresponding to the method of claim 12.

24. A non-transitory, computer-readable medium storing computer-executable instructions that, when executed by processing circuitry of a network node, in a radio access network (RAN) that is configured for communication between a UE and the network node, configure the network node to perform operations corresponding to the method of claim 12.

* * * * *